(12) United States Patent
Pekrul et al.

(10) Patent No.: US 6,583,076 B1
(45) Date of Patent: Jun. 24, 2003

(54) NONWOVEN FABRICS PREPARED USING VISBROKEN SINGLE-SITE CATALYZED POLYPROPYLENE

(75) Inventors: Robert Louis Pekrul, Alpharetta, GA (US); Peter Michailovich Kobylivker, Marietta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 09/439,257

(22) Filed: Nov. 12, 1999

Related U.S. Application Data
(60) Provisional application No. 60/115,254, filed on Jan. 8, 1999.

(51) Int. Cl.$^7$ .............. D04H 1/56; D04H 3/16; D04H 1/00; D04H 13/00; D04H 3/00
(52) U.S. Cl. .............. 442/400; 442/327; 442/401
(58) Field of Search ............... 442/327, 400, 442/401

(56) References Cited

U.S. PATENT DOCUMENTS

| | | | |
|---|---|---|---|
| 3,338,992 A | 8/1967 | Kinney | 264/24 |
| 3,341,394 A | 9/1967 | Kinney | 161/72 |
| 3,502,538 A | 3/1970 | Petersen | 161/150 |
| 3,502,763 A | 3/1970 | Hartmann | 264/210 |
| 3,542,615 A | 11/1970 | Dobo et al. | 156/181 |
| 3,692,618 A | 9/1972 | Dorschner et al. | 161/72 |
| 3,802,817 A | 4/1974 | Matsuki et al. | 425/66 |
| 3,849,241 A | 11/1974 | Butin et al. | 161/169 |
| 4,282,076 A | 8/1981 | Boynton | 204/159.2 |
| 4,340,563 A | 7/1982 | Appel et al. | 264/518 |
| 4,375,531 A | 3/1983 | Ross | 525/93 |
| 4,542,199 A | 9/1985 | Kaminsky et al. | 526/160 |
| 5,064,802 A | 11/1991 | Stevens et al. | 502/155 |
| 5,108,820 A | 4/1992 | Kaneko et al. | 428/198 |
| 5,108,827 A | 4/1992 | Gessner | 428/219 |
| 5,189,192 A | 2/1993 | LaPointe et al. | 556/11 |
| 5,250,631 A | 10/1993 | McCullough, Jr. | 525/322 |
| 5,270,369 A | 12/1993 | Willcox et al. | 524/236 |
| 5,336,552 A | 8/1994 | Strack et al. | 428/224 |
| 5,349,100 A | 9/1994 | Mintz | 585/350 |
| 5,352,749 A | 10/1994 | DeChellis et al. | 526/68 |
| 5,359,004 A | 10/1994 | Wilpers et al. | 525/194 |
| 5,362,782 A | 11/1994 | McCullough, Jr. et al. | 524/108 |
| 5,374,696 A | 12/1994 | Rosen et al. | 526/126 |
| 5,382,400 A | 1/1995 | Pike et al. | 264/168 |
| 5,405,917 A | 4/1995 | Mueller, Jr. et al. | 525/333.8 |
| 5,529,845 A | 6/1996 | Branchesi et al. | 428/359 |
| 5,530,073 A | 6/1996 | Schoenberg | 525/345 |
| 5,681,646 A * | 10/1997 | Ofosu et al. | 428/198 |
| 5,723,217 A | 3/1998 | Stahl et al. | 428/401 |
| 5,736,465 A | 4/1998 | Stahl et al. | 428/298 |
| 6,281,289 B1 * | 8/2001 | Maugans et al. | 525/191 |

FOREIGN PATENT DOCUMENTS

| | | | |
|---|---|---|---|
| EP | 0063654 | 11/1982 | C08F/8/50 |
| EP | 0924322 | 6/1999 | D01D/5/30 |
| EP | 0985686 | 3/2000 | C08F/8/50 |

OTHER PUBLICATIONS

*Encyclopedia of Polymer Science and Engineering*, A Wiley–Interscience Publication, John Wiley & Sons, vol. 3, 299–300, 1985.

Wagener, K.B.: *Oscillating Catalysts: A New Twist for Plastics*, Science, vol. 267, 191, Jan. 13, 1995.

Coates, Geoffrey W. and Waymouth, Robert M.: *Oscillating Stereocontrol: A Strategy for the Synthesis of Thermoplastic Elastomeric Polypropylene*, Science, vol. 267, 217–219, Jan. 13, 1995.

*Polymer Blends and Composites*, Manson, John A. and Sperling, Leslie H.; Plenum Press, New York, Copyright 1976; ISBN 0–306–30831–2, pp. 273–277.

* cited by examiner

*Primary Examiner*—Elizabeth M. Cole
*Assistant Examiner*—Norca L. Torres
(74) *Attorney, Agent, or Firm*—Pauley Petersen Kinne & Erickson

(57) ABSTRACT

Nonwoven filaments having improved melt spinning process characteristics and end use properties are prepared using a visbroken single-site catalyzed propylene polymer. The propylene polymer has a first melt flow rate (MFR) before visbreaking and a second MFR after visbreaking, such that the ratio of the second MFR to the first MFR is about 1:1 to about 3:1. The nonwoven filaments exhibit less filament tension during spinning, and permit higher line speeds before breaking, than similar filaments prepared using a single-site catalyzed propylene polymer having the second MFR straight out of the reactor, and which has not been visbroken.

34 Claims, No Drawings

NONWOVEN FABRICS PREPARED USING VISBROKEN SINGLE-SITE CATALYZED POLYPROPYLENE

This application claims the benefit of provisional application Ser. No. 60/115,254 filed Jan. 8, 1999.

FIELD OF THE INVENTION

This invention relates to nonwoven fibers and fabrics prepared using visbroken single-site catalyzed polypropylene, wherein the ratio of the melt flow rate (MFR) of the polypropylene after visbreaking to its MFR before visbreaking is from about 1:1 to about 3:1.

BACKGROUND OF THE INVENTION

Conventional, Ziegler-Natta catalyzed polypropylenes have a relatively broad molecular weight distribution after leaving the reactor. It has long been known to partially degrade or "visbreak" propylene homopolymers and copolymers to narrow the molecular weight distributions. Visbreaking processes are disclosed, for instance, in U.S. Pat. No. 4,282,076, issued to Boynton et al. and U.S. Pat. No. 5,250,631, issued to McCullough, Jr., et al. Visbreaking techniques involve thermal degradation, radiation, and the use of peroxides and other catalysts. Visbreaking of conventional polypropylenes leads to narrower molecular weight distributions (as well as lower average molecular weights) because initially larger polypropylene molecules are more susceptible to visbreaking than initially smaller polypropylene molecules. U.S. Pat. No. 5,723,217 issued to Stahlet al., discloses that the melt spinning of conventional (Ziegler-Natta catalyzed) propylene polymers improves with the degradation of the polymers using peroxide. Stahl et al. further discloses the melt spinning of propylene polymers prepared using single-site metallocene-type catalysts. According to Stahl et al., reactor-grade (i.e. non-visbroken) single-site catalyzed propylene polymers provide the same fiber spinning advantages as visbroken Ziegler-Natta propylene polymers, because the single-site polymers have narrower molecular weight distributions leaving the reactor. These advantages include, for instance, better ease of processing and the ability to make small diameter, high strength fibers. Thus, the use of a metallocene catalyzed propylene polymer eliminates the need for a visbreaking process step.

Stahl et al. further discloses that metallocene catalyzed propylene polymers can be visbroken to a lower molecular weight to facilitate fiber production. Stahl et al. alleges that the visbreaking does not change the molecular weight distribution, defined as the ratio of weight average molecular weight to number average molecular weight. From the disclosure of Stahl et al., for instance, it would appear that a reactor grade 5 MFR polymer which is visbroken to 55 MFR, results in a polymer having the same narrow molecular weight distribution as before. For purposes of melt spinning, there is no apparent incentive to visbreak a lower MFR metallocene polymer to a higher MFR, as opposed to melt spinning a higher MFR reactor grade metallocene polymer which has not been visbroken.

SUMMARY OF THE INVENTION

It has been discovered, unexpectedly, that a single-site catalyzed propylene polymer visbroken to a higher MFR from a lower MFR exhibits better melt spinning properties than a similar single-site catalyzed reactor grade propylene polymer initially having the higher MFR, when the ratio of the higher MFR to the lower MFR is about 1:1 to about 3:1. Thus, contrary to the teachings of the prior art, there is an advantage to visbreaking a lower MFR single-site catalyzed propylene polymer to a higher MFR, instead of simply producing the higher MFR polymer in a polymerization reactor.

The present invention is directed to nonwoven fibers which are spun from a metallocene catalyzed propylene polymer which has been visbroken from a lower MFR to a higher MFR, wherein the ratio of the higher MFR to the lower MFR is about 1:1 to about 3:1. The present invention is also directed to nonwoven fabrics produced from the fibers, and to personal care and medical products that include the nonwoven fabrics.

It is a feature and advantage of the invention to provide a relatively strong, thin fiber made from a single-site catalyzed propylene polymer visbroken from a lower MFR to a higher MFR, and which may be thinner (finer) than would be produced under similar conditions using a reactor grade single-site propylene polymer having the higher MFR.

It is also a feature and advantage of the invention to produce a nonwoven web of fibers made using the visbroken single-site catalyzed propylene polymer, and various personal care and medical products incorporating the nonwoven web.

DEFINITIONS

The term "nonwoven fabric or web" means a web having a structure of individual fibers or threads which are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.) The term "microfibers" means small diameter fibers having an average diameter not greater than about 75 microns, for example, having an average diameter of from about 7 microns to about 30 microns. Another frequently used expression of fiber diameter is denier, which is defined as grams per 9000 meters of a fiber. For a fiber having circular cross-section, denier may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by .00707. Thus, a 15 micron polypropylene fiber has a denier of about 1.42 calculated as ($15^2 \times 0.89 \times .00707 = 1.415$). Outside the United States the unit of measurement is more commonly the "tex," which is defined as the grams per kilometer of fiber. Tex may be calculated as denier /9.

The term "spunbonded fibers" refers to small diameter fibers which are formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S.

Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average diameters larger than about 7 microns, more generally, between about 10 and 75 microns.

The term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally self bonding when deposited onto a collecting surface. Meltblown fibers used in the present invention are preferably substantially continuous in length.

The term "monocomponent" fibers refers to fibers formed from one or more extruders using only one polymer. This is not meant to exclude fibers formed from one polymer to which small amounts of additives have been added for color, anti-static properties, lubrication, hydrophilicity, etc. These additives, e.g., titanium dioxide for color, are generally present in an amount less than 5 weight percent and more typically about 2 weight percent.

The term "bicomponent filaments or fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side-by-side arrangement or an "islands-in-the-sea" arrangement. Bicomponent fibers are taught in U.S. Pat. No. 5,108,820 to Kaneko et al., U.S. Pat. No. 5,336,552 to Strack et al., and U.S. Pat. No. 5,382,400 to Pike et al., each of which is incorporated herein in its entirety by reference. For two component fibers, the polymers may be present in ratios of 75/25, 50/50, 25/75 or any other desired ratios. Conventional additives, such as pigments and surfactants, may be incorporated into one or both polymer streams, or applied to the filament surfaces.

The term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, ISBN 0-306-30831-2, at Pages 273 through 277.

The term "blend" as applied to polymers, means a mixture of two or more polymers while the term "alloy" means a sub-class of blends wherein the components are immiscible but have been compatibilized.

The term "polymer" includes, but is not limited to, homopolymers, copolymers, such as for example, block, graft, random and alternating copolymers, terpolymers, etc. and blends and modifications thereof Furthermore, unless otherwise specifically limited, the term "polymer" shall include all possible geometrical configurations of the material. These configurations include, but are not limited to isotactic, syndiotactic and atactic symmetries.

The term "propylene polymer" includes both propylene homopolymers and copolymers. Especially useful are polymers containing a preponderance of propylene, such as homopolymers and copolymers containing about 90–100% by weight propylene and about 0–10% by weight of ethylene or 0–50% by weight of a $C_4$–$C_{20}$ alpha-olefin comonomer. Propylene homopolymers and random copolymers are especially preferred.

The term "single site catalyzed" propylene polymers include propylene polymers and copolymers produced by single-site catalysis, including without limitation metallocene catalyzed propylene homopolymers and copolymers. The metallocene process for making polyolefins uses a metallocene catalyst which is activated (i.e. ionized) by a co-catalyst.

Polymers produced using metallocene catalysts have a narrow molecular weight distribution. "Narrow molecular weight distribution polymer" refers to a polymer that exhibits a molecular weight distribution of less than about 3.5. As is known in the art, the molecular weight distribution of a polymer is the ratio of the weight average molecular weight of the polymer to the number average molecular weight of the polymer. Methods of determining molecular weight distribution are described in the *Encyclopedia of Polymer Science and Engineering*, Volume 3, Pages 299–300 (1985). Examples of narrow molecular weight distribution polyolefins include metallocene-catalyzed polyolefins, constrained geometry-catalyzed polyolefins, and other single-site catalyzed polyolefins, described above. Polydispersities ($M_w/M_n$) of below 3.5 and even below 2 are possible for metallocene produced polymers. These polymers also have a narrow short chain branching distribution when compared to similar Ziegler-Natta produced polymers.

Metallocene catalysts include bis(n-butylcyclopentadienyl) titanium dichloride, bis(n-butylcyclopentadienyl)zirconium dichloride, bis (cyclopentadienyl)-scandium chloride, bis(indenyl) zirconium dichloride, bis(methylcyclopentadienyl)-titanium dichloride, bis(methylcyclopentadienyl)zirconium dichloride, cobaltocene, cyclopentadienyltitanium trichloride, ferrocene, hafnocene dichloride, isopropyl-(cyclopentadienyl$_1$-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow.

The metallocene process, and particularly the catalysts and catalyst support systems are the subject of a number of patents. U.S. Pat. No. 4,542,199 to Kaminsky et al. describes a procedure wherein a metallocene catalyst of the general formula (cyclopentadienyl)2MeRHal wherein Me is a transition metal, Hal is a halogen and R is cyclopentadienyl or a $C_1$ to $C_6$ alkyl radical or a halogen, is used to form polyethylene. U.S. Pat. No. 5,189,192 to LaPointe et al. and assigned to Dow Chemical describes a process for preparing addition polymerization catalysts via metal center oxidation. U.S. Pat. No. 5,352,749 to Exxon Chemical Patents, Inc. describes a method for polymerizing monomers in fluidized beds. U.S. Pat. No. 5,349,100 describes chiral metallocene compounds and preparation thereof by creation of a chiral center by enantioselective hydride transfer.

Co-catalysts are materials such as methylaluminoxane (MAO) which is the most common, other alkylaluminums and boron containing compounds like tris (pentafluorophenyl)boron, lithium tetrakis (pentafluorophenyl)boron, and dimethylanilinium tetrakis (pentafluorophenyl)boron. Research is continuing on other co-catalyst systems or the possibility of minimizing or even eliminating the alkylaluminums because of handling and product contamination issues. The important pont is that the metallocene catalyst be activated or ionized to a cationic form for reaction with the monomer(s) to be polymerized.

It is also possible using a metallocene catalyst system to control the isotacticity of the polymer quite closely when stereo selective metallocene catalysts are employed. In fact, polymers have been produced having an isotacticity in excess of 99 percent. It is also possible to produce highly syndiotactic polypropylene using this system.

Controlling the isotacticity of a polymer can also result in the production of a polymer which contains blocks of isotactic and blocks of atactic material alternating over the length of the polymer chain. This construction results in an elastic polymer by virtue of the atactic portion. Such polymer synthesis is discussed in the journal *Science*, Volume 267 (Jan. 13, 1995) at Page 191 in an article by K. B. Wagner. Wagner, in discussing the work of Coates and Waymouth, explains that the catalyst oscillates between the stereochemical forms resulting in a polymer chain having running lengths of isotactic stereocenters connected to running lengths of atactic centers. Isotactic dominance is reduced producing elasticity. Geoffrey W. Coates and Robert M. Waymouth, in an article entitled "Oscillating Stereocontrol: A Strategy for the Synthesis of Thermoplastic Elastomeric Polypropylene" at Page 217 in the same issue, discuss their work in which they used metallocene bis(2-phenylindenyl)-zirconium dichloride in the presence of methylaluminoxane (MAO), and, by varying the pressure and temperature in the reactor, oscillate the polymer form between isotactic and atactic.

Commercial production of metallocene polymers is somewhat limited but growing. Such polymers are available from Exxon Chemical Company of Baytown, Texas under the trade name ACHIEVE® for polypropylene based polymers and EXACTS® for polyethylene based polymers. Dow chemical company of Midland, Michigan has polymers commercially available under the name ENGAGE®. These materials are believed to be produced using non-stereo selective metallocene catalysts. Exxon generally refers to their metallocene catalyst technology as "single site" catalysts while Dow refers to theirs as "constrained geometry" catalysts under the name INSIGHT® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade.

The term "reactor grade" refers to a propylene polymer which has not been visbroken, i.e., has not been subjected to a molecular degradation process, after its initial production in a polymerization reactor. The term "reactor grade" is intended to exclude polymers which have been visbroken to lower their initial molecular weight, and/or to alter their initial molecular weight distribution.

The term "substantially continuous filaments or fibers" refers to filaments or fibers prepared by extrusion from a spinneret, including without limitation spunbonded and meltblown fibers, which are not cut from their original length prior to being formed into a nonwoven web or fabric. Substantially continuous filaments or fibers may have lengths ranging from greater than about 15 cm to more than one meter; and up to or beyond the length of the web or fabric being formed. The definition of "substantially continuous filaments or fibers" includes those which are not cut prior to being formed into a nonwoven web or fabric, but which are later cut when the nonwoven web or fabric is cut.

The term "staple fibers" means shorter fibers which are natural or cut from a manufactured filament prior to forming into a web, and which have an average length ranging from about 0.1–15 cm, more commonly about 0.2–7 cm.

The term "sticking point" of fibers extruded from a spinneret refers to the maximum fiber distance, measured from the face of the spinneret, where a metal rod placed in contact with the fibers will stick to them. A circular aluminum rod having a 0.5 inch diameter is placed adjacent to the fibers at a large distance from the spinneret, and is gradually moved along the adjacent fiber surfaces in a direction approaching the spinneret. When the fibers begin sticking to the rod, the distance from the rod to the spinneret is recorded as the sticking point.

The term "fiber tenacity" refers to a measurement made in accordance with ASTM D3822, modified to the extent that 72 filaments (instead of one) are tested using a Textechno Statiomat M measuring device. The gauge length used is 100 mm, the test speed is 1270 mm/min, and the pre-tension is set at 0.5 centinewtons per text. The standard test procedure is otherwise followed.

The term "personal care product" includes diapers, training pants, swim wear, absorbent underpants, baby wipes, adult incontinence products, and feminine hygiene products, and the like, as well as other surge and intake material products.

The term "medical care product" includes medical garments, underpads, absorbent drapes, bandages, medical wipes, and the like.

DETAILED DESCRIPTION OF THE PRESENTLY PREFERRED EMBODIMENTS

The starting material for the invention is a single-site catalyzed propylene polymer, which may be a homopolymer or any of the copolymers indicated above. Preferred propylene polymers include homopolymers and copolymers containing up to about 10% by weight of ethylene or up to about 50% by weight of a $C_4$–$C_{20}$ alpha-olefin comonomer. The ethylene content should be limited because some of the visbreaking processes which advantageously affect polypropylene, may cause gelling, crosslinking and other less desirable reactions in polyethylene-type materials. Thus, it is preferred that any ethylene comonomer be present at a low level. Propylene homopolymers and random copolymers are preferred over block copolymers, for similar reasons. Isotactic propylene homopolymers and copolymers are generally preferred over atactic and syndiotactic materials, although combinations of different stereoisomers may be advantageous in some circumstances.

The starting propylene polymer may be a reactor grade single-site catalyzed material. For instance, the starting material may be a reactor grade metallocene-catalyzed propylene polymer, or a reactor grade constrained geometry-catalyzed propylene polymer. The starting propylene polymer can be characterized in terms of a melt flow rate (MFR), measured at 230° C. in accordance with ASTM D1238(1), and reported in grams per 10 minutes. The starting propylene polymer should have a MFR of about 3 to about 250, preferably about 10 to about 150, more preferably about 20 to about 100.

The starting propylene polymer is subjected to a visbreaking process which reduces its average molecular weight, resulting in a visbroken propylene polymer. The visbreaking may be accomplished using conventional techniques familiar to persons skilled in the art. For instance, the visbreaking may be accomplished using a peroxide to facilitate molecular scission of the propylene molecules. The visbreaking may also be accomplished using heat (often 300–400° C.), radiation, shear (e.g., using an extruder), combinations of the foregoing techniques, or any other technique which accomplishes the desired level of molecular scission.

Preferably, the visbreaking is accomplished with the aid of a peroxide catalyst. Suitable catalysts include, for instance, alkyl hydroperoxides and dialkyl peroxides, as disclosed in U.S. Pat. No. 4,282,076, issued to Boynton. One suitable peroxide is 2,5-dimethyl-2,5-bis(t-butylperoxy) hexane. Another suitable peroxide is 2,5-dimethyl-2,5-bis(t-butylperoxy)hexane-3. These peroxides are available under the trade name LUPERSOL® from Pennwalt Corporation.

The peroxide may be added to the propylene polymer in a molten state at about 180–300° C in an extruder, for instance. The amount of heat will affect the rate and extent of the visbreaking. The peroxide may be added at about 0.001–2.0% by weight of the propylene polymer, preferably about 0.1–1.0% by weight of the polymer, more preferably about 0.2–0.7% by weight of the propylene polymer.

The visbreaking conditions should be selected and controlled so that the visbroken propylene polymer exhibits only a relatively minor amount of degradation, in comparison to the starting propylene polymer. The visbroken propylene polymer should have an MFR that is about 1.0–3.0 times the MFR of the starting propylene polymer. The visbroken propylene polymer preferably has an MFR that is about 1.3–2.7 times the MFR of the starting propylene polymer, more preferably about 1.5–2.5 times the MFR of the starting propylene polymer. Also, the visbroken propylene polymer should have an MFR of at least about 10, preferably about 20–150, more preferably about 30–100, to render it particularly useful for melt spinning applications.

The visbroken propylene polymer may be used alone in a melt spinning process, or may be combined with one or more other polymers. For instance, the visbroken propylene polymer may be combined with one or more polymers selected from polyamides, polyesters, polyolefins, copolymers of ethylene and propylene, copolymers of ethylene or propylene with a $C_4$–$C_{20}$ alpha-olefin, terpolymers of ethylene with propylene and a $C_4$–$C_{20}$ alpha-olefin, ethylene vinyl acetate copolymers, propylene vinyl acetate copolymers, styrene-poly(ethylene-alpha-olefin) elastomers, polyurethanes, A-B block copolymers where A is formed of poly(vinyl arene) moieties such as polystyrene and B is an elastomeric midblock such as a conjugated diene or lower alkene, polyethers, polyether esters, polyacrylates, ethylene alkyl acrylates, polyisobutylene, poly-1-butene, copolymers of poly-1-butene including ethylene-1-butene copolymers, polybutadiene, isobutylene-isoprene copolymers, and combinations of any of the foregoing. Polyolefin homopolymers and copolymers are preferred as additional polymers. Polyethylene and polypropylene homopolymers and copolymers are most preferred.

If the visbroken propylene polymer is blended or alloyed with an additional polymer, it is generally preferred that the blending or alloying take place after the visbreaking of the single-site catalyzed propylene polymer. This way, the visbreaking process will not influence the properties of the additional polymer. When making blended or biconstituent filaments or fibers, the amount of visbroken propylene polymer relative to the additional polymer may vary considerably depending on the application. The polymer blend should include at least 10% by weight of the visbroken single-site catalyzed propylene polymer, preferably at least 25% by weight, more preferably at least 50% by weight.

The visbroken propylene polymer and one or more additional polymers may also be extruded adjacent each other in the form of bicomponent filaments or fibers. Again, the ratios of each polymer may vary considerably depending on the application. The bicomponent filaments should include at least 10% by weight of the visbroken single-site catalyzed propylene polymer, preferably at least 25% by weight, more preferably at least 50% by weight.

The nonwoven web produced by the melt spinning process may be a spunbond web, a meltblown web, a bonded carded web, an air laid web, or another type of nonwoven web, and may be present in a single layer or a multilayer composite including one or more nonwoven web layers. Whether the visbroken propylene polymer is used alone or in combination with another polymer, the primary functions of the visbroken polymer are to facilitate production of fine fibers (e.g. very fine fibers) having acceptable strength for various end use applications.

Nonwoven webs containing the visbroken single-site catalyzed propylene polymer can be manufactured using a wide variety of melt spinning processes, including conventional melt spinning processes. One suitable melt spinning process is described in U.S. Pat. No. 3,802,817, issued to Matsuki et al., which is incorporated herein by reference. That process may also be referred to as a partially oriented yarn (POY) fiber line. In that process, a curtain of melt spun filaments are extruded from a spinneret and drawn to a desired filament diameter with the aid of air jet streams applied on both sides of the curtain. The airjets are oriented such that they interact to create a suction force which draws the filaments following their extrusion. The average diameter of the manufactured filaments is influenced, to an extent, by the diameter of the spinneret openings as well as the tension force exhibited by the polymer material, which opposes the suction force exerted by the air streams.

In another type of POY fiber line, the filaments may be mechanically drawn using drawing rollers, for instance, instead of being air drawn. In each type of POY line, the filaments are drawn while in a molten or partially molten state, after being extruded from a spinneret.

Fibers containing the visbroken single-site catalyzed propylene polymer exhibit reduced tension at a given fiber drawing (e.g., mechanically driven rolls) speed. For instance, it has been discovered that fibers made entirely from a visbroken single-site catalyzed propylene polymer of a given MFR, exhibit less tension at a given fiber drawing speed than a similar reactor grade single-site catalyzed propylene polymer having the same MFR. Conversely, at a given tension, a higher fiber drawing speed is attained which results in fibers having smaller average diameters. The increase in attainable drawing speed also facilitates the manufacture of finer nonwoven fibers in other melt spinning processes, in which fiber diameter is controlled by suction air or different mechanisms. The improved ease of drawing, coupled with high fiber strength and integrity, also reduces the incidence of fiber breakage, damage, swelling, and other detrimental processing factors. Thus, higher production rates can be achieved without interference from these factors.

The nonwoven fibers produced can be in the form of substantially continuous filaments, or shorter (cut) staple fibers. A wide variety of nonwoven fiber diameters can be achieved depending on the melt spinning process employed, the process conditions, the specific characteristics of the visbroken single-site catalyzed propylene polymer, and whether the visbroken polymer is used alone or in combination with other polymers. While large diameter fibers can be produced, a key feature of the invention is the enablement of fine fiber production. The fibers produced using the visbroken single-site catalyzed propylene polymer may have diameters less than 1 micron to about 75 microns, preferably about 7 microns to about 30 microns, more preferably, about 15 microns to about 25 microns.

Nonwoven fabrics prepared according to the invention can be used in a wide variety of product applications including, in particular, personal care products. Personal care products include, without limitation, diapers, training pants, swim wear, absorbent underpants, baby wipes, adult incontinence products, feminine hygiene products, and the like. In absorbent products, the nonwoven fabric can be used as a cover sheet or containment matrix for an absorbent medium. The treated nonwoven fabric can also be used in medical products, including without limitation medical garments, underpads, absorbent drapes, bandages, and medical wipes.

EXAMPLES

A metallocene-catalyzed polypropylene having a reactor MFR of 24 grams/10 min. was visbroken using a peroxide, to an MFR of 50 grams/10 min. The visbroken polypropylene was melt spun using a partially oriented yarn (POY) fiber line which utilizes mechanical drawing rollers to draw the fibers. A similar metallocene-catalyzed polypropylene resin, which was not visbroken but had a reactor MFR of 50 grams/10 min. was melt spun on the same line for comparison.

Fibers made with the visbroken polypropylene exhibited reduced spinline tension (especially at higher take-up speed), as well as higher sticking point distance, higher breakage speed, and higher tenacity, compared to fibers made with the reactor grade polypropylene. Table 1 summarizes the results.

TABLE 1

| Example Nos.: | 1 | 2 | 3 | 4 |
|---|---|---|---|---|
| Polypropylene | Visbroken, 50 MFR | Visbroken, 50 MFR | Reactor Grade, 50 MFR | Reactor Grade, 50 MFR |
| Spin Pump | 10 rpm | 10 rpm | 10 rpm | 10 rpm |
| Quench Air Speed | 30 ft/min. | 30 ft/min. | 30 ft/min. | 30 ft/min. |

TABLE 1-continued

| Example Nos.: | 1 | 2 | 3 | 4 |
|---|---|---|---|---|
| Melt Temp. | 450° F. | 450° F. | 450° F. | 450° F. |
| Quench Air Temp. | 49° F. | 49° F. | 50° F. | 50° F. |
| Take-Up Speed | 2000 ft/min. | 3000 ft/min. | 2000 ft/min. | 3000 ft/min. |
| Spinline Tension | 32 grams | 48 grams | 33 grams | 55 grams |
| Sticking Point | 140 cm | 115 cm | 135 cm | 105 cm |
| Breakage Speed | 4490 | 4580 | 4220 | 4260 |
| Fiber Tenacity, grams per denier, ASTM Procedure D3822 (modified) | 3.42 | 4.03 | 3.15 | 3.86 |
| Fiber Denier | 3 | 2 | 3 | 2 |
| Fiber Diameter (microns) | 22 | 18 | 22 | 18 |

While the embodiments of the invention described herein are presently preferred, various modifications and improvements can be made without departing from the spirit and scope of the invention. The scope of the invention is indicated in the appended claims, and all changes that fall within the meaning and range of equivalents are intended to be embraced therein.

We claim:

1. A nonwoven fabric including a plurality of melt spun filaments;

the melt spun filaments comprising a visbroken single-site catalyzed propylene polymer having a molecular weight distribution of less than about 3.0 before visbreaking, and a first lower MFR before visbreaking and a second higher MFR after visbreaking;

the second MFR having a value which is about 1–3 times the value of the first MFR;

wherein the visbreaking is accomplished using at least one of peroxide, heat, radiation, and shear.

2. The nonwoven fabric of claim 1, wherein the second MFR is about 1.3–2.7 times the first MFR.

3. The nonwoven fabric of claim 1, wherein the second MFR is about 1.5–2.5 times the first MFR.

4. The nonwoven fabric of claim 1, wherein the second MFR is at least about 10.

5. The nonwoven fabric of claim 1, wherein the second MFR is about 20–150.

6. The nonwoven fabric of claim 1, wherein the second MFR is about 30–100.

7. The nonwoven fabric of claim 1, wherein the visbroken single-site catalyzed propylene polymer comprises a propylene homopolymer.

8. The nonwoven fabric of claim 1, wherein the visbroken single-site catalyzed propylene polymer comprises a propylene copolymer containing up to about 10% by weight ethylene.

9. The nonwoven fabric of claim 1, wherein the visbroken single-site catalyzed propylene polymer comprises a propylene copolymer containing up to about 50% by weight of a $C_4$–$C_{20}$ alpha-olefin comonomer.

10. The nonwoven fabric of claim 1, wherein the visbroken single-site catalyzed propylene polymer comprises a metallocene-catalyzed propylene polymer.

11. The nonwoven fabric of claim 1, wherein the melt spun filaments consist essentially of the visbroken single-site catalyzed propylene polymer.

12. The nonwoven fabric of claim 1, wherein the melt spun filaments further comprise one or more additional polymers blended with the single-site catalyzed propylene polymer.

13. The nonwoven fabric of claim 1, wherein the melt spun filaments comprise bicomponent filaments.

14. The nonwoven fabric of claim 1, comprising a spunbond web.

15. The nonwoven fabric of claim 1, comprising a meltblown web.

16. The nonwoven fabric of claim 1, comprising a bonded carded web.

17. The nonwoven fabric of claim 1, comprising an air laid web.

18. A nonwoven fabric including a plurality of melt spun filaments having an average diameter up to about 75 microns;

the melt spun filaments comprising a visbroken single-site catalyzed propylene polymer having a molecular weight distribution of less than about 3.0 before visbreaking, and a first lower MFR before visbreaking and a second higher MFR after visbreaking;

the second MFR having a value which is about 1–3 times the value of the first MFR;

wherein the visbreaking is accomplished using at least one of peroxide, heat, radiation, and shear.

19. The nonwoven fabric of claim 18, wherein the average filament diameter is about 7–30 microns.

20. The nonwoven fabric of claim 18, wherein the average filament diameter is about 15–25 microns.

21. A personal care product comprising a nonwoven fabric;

the nonwoven fabric including a visbroken single-site catalyzed propylene polymer having a molecular weight distribution of less than about 3.0 before visbreaking, and a first lower MFR before visbreaking and a second higher MFR after visbreaking;

the second MFR having a value which is about 1–3 times the value of the first MFR;

wherein the visbreaking is accomplished using at least one of peroxide, heat, radiation, and shear.

22. The personal care product of claim 21, comprising a diaper.

23. The personal care product of claim 21, comprising training pants.

24. The personal care product of claim 21, comprising swim wear.

25. The personal care product of claim 21, comprising absorbent underpants.

26. The personal care product of claim 21, comprising a baby wipe.

27. The personal care product of claim 21, comprising an adult incontinence product.

28. The personal care product of claim 21, comprising a feminine hygiene product.

29. A medical product comprising a nonwoven fabric;

the nonwoven fabric including a visbroken single-site catalyzed propylene polymer having a molecular weight distribution of less than about 3.0 before visbreaking, and a first lower MFR before visbreaking and a second higher MFR after visbreaking;

the second MFR having a value which is about 1–3 times the value of the first MFR;

wherein the visbreaking is accomplished using at least one of peroxide, heat, radiation, and shear.

30. The medical product of claim 29, comprising a medical garment.

31. The medical product of claim 29, comprising an underpad.

32. The medical product of claim 29, comprising an absorbent diaper.

33. The medical product of claim 29, comprising a bandage.

34. The medical product of claim 29, comprising a medical wipe.

* * * * *